United States Patent [19]

Nishina et al.

[11] Patent Number: 4,949,377

[45] Date of Patent: Aug. 14, 1990

[54] TELEPHONE STERILIZER

[76] Inventors: Dorothy O. Nishina, 78-6401 Mamalahoa Hwy., Holualoa, Hi. 96725; George Spector, 233 Broadway, Rm. 3815, New York, N.Y. 10007

[21] Appl. No.: 291,578

[22] Filed: Dec. 29, 1988

[51] Int. Cl.[5] .......................... H04R 1/12; H04M 1/17

[52] U.S. Cl. ...................................... 379/452; 379/439

[58] Field of Search ................ 379/451, 452, 437, 439

[56] References Cited

U.S. PATENT DOCUMENTS

| | | | |
|---|---|---|---|
| 932,545 | 8/1909 | Haff | 379/452 |
| 1,140,996 | 5/1915 | Miller | 379/452 |
| 1,610,659 | 12/1926 | Craig | 379/452 |
| 2,078,877 | 4/1937 | Hoyland | 379/451 |
| 2,291,030 | 7/1942 | Faltz | 379/452 |
| 2,507,755 | 5/1950 | Hartwell et al. | 379/452 |
| 2,593,382 | 4/1952 | Zimmermann | 379/452 |
| 2,669,610 | 2/1954 | Dent | 379/452 |
| 2,700,075 | 1/1955 | Korn | 379/452 |
| 3,001,033 | 9/1961 | Rosenblum | 379/452 |
| 3,148,249 | 9/1964 | King | 379/452 |
| 3,238,313 | 3/1966 | Kalogris | 379/452 |
| 3,304,379 | 2/1967 | Memmel et al. | 379/452 |
| 3,589,106 | 6/1971 | Onuki | 379/452 |
| 3,643,040 | 2/1972 | Kaneyasu | 379/452 |
| 4,090,044 | 5/1978 | Kaneyasu | 379/439 |
| 4,751,731 | 6/1988 | O'Connor | 379/439 |
| 4,819,264 | 4/1989 | Lemley | 379/452 |

FOREIGN PATENT DOCUMENTS

| | | | |
|---|---|---|---|
| 2499793 | 8/1982 | France | 379/452 |
| 659294 | 1/1964 | Italy | 379/452 |
| 1141985 | 2/1969 | United Kingdom | 379/452 |

*Primary Examiner*—Jin F. Ng
*Assistant Examiner*—Danita R. Byrd

[57] ABSTRACT

A telephone sterilizing device for a transmitter/receiver portion of a telephone handset is provided and consists of a disinfectant carrying pad having a central aperture therethrough and of general shape corresponding to the telephone handset portion, a layer of gauze material covering the central aperture, layer of adhesive on one side of the pad and a protective cover removably affixed to the adhesive layer whereby removal of the protective cover will enable the adhesive material on the pad to be applied to the telephone handset portion to sterilize it.

4 Claims, 1 Drawing Sheet

TELEPHONE STERILIZER

BACKGROUND OF THE INVENTION

The instant invention relates generally to telephones and more specifically it relates to a telephone sterilizing device.

Numerous telephones have been provided in prior art that are adapted to include attachments which keep the speakers in a sanitary condition. For example, U.S. Pat. Nos. 2,593,382; 4,090,044 and 4,751,731 all are illustrative of such prior art. While these units may be suitable for the particular purpose to which they address, they would not be as suitable for the purposes of the present invention as heretofore described.

SUMMARY OF THE INVENTION

A primary object of the present invention is to provide a telephone sterilizing device that will overcome the shortcomings of the prior art devices.

Another object is to provide a telephone sterilizing device which when attached thereto will disenfect and protect the transmitter/receiver portion of the telephone handset.

An additional object is to provide a telephone sterilizing device in which disinfectant liquid in a cell within a sponge rubber pad can be squeezed out when pressed against the face of a person using the telephone handset.

A further object is to provide a telephone sterilizing device that is simple and easy to use.

A still further object is to provide a telephone sterilizing device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
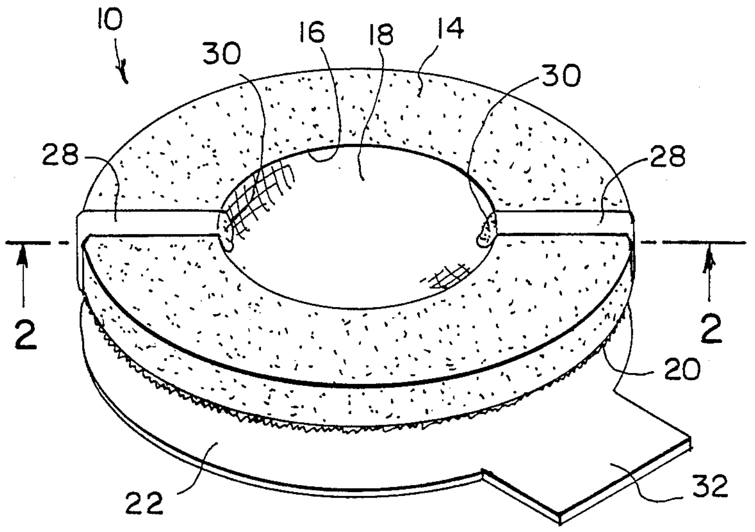
FIG. 1 is a perspective view of the invention for disinfecting and protecting part of a telephone handset.
Figure 2:
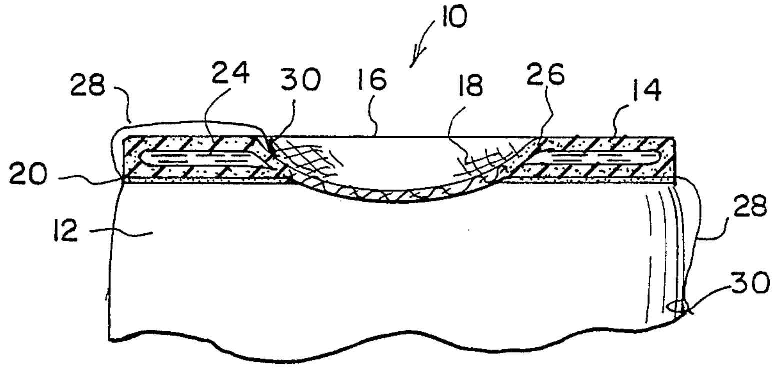
FIG. 2 is a cross sectional view taken along line 2—2 in FIG. 1, showing the invention installed onto the handset.

Turning now descriptively to the drawings, in which similar reference characters denote similar elements throughout the several views, FIGS. 1 and 2 illustrate a telephone sterilizing device 10 for a transmitter/-receiver portion of a telephone handset 12. The device 10 consists of a sterilizing substance carrying pad 14 that has a central aperture 16 therethrough and a peripheral shape corresponding generally to the receiving or transmitting portions of a telephone handset. A layer of gauze material 18 is attached to and substantially covers the central aperture 16 to allow sound to travel therethrough while protecting the telephone handset portion 12. A layer of adhesive material 20 is applied to one side of the pad 14. A protective cover 22 as shown in FIG. 1, has a peripheral shape corresponding to the pad 14 and is removably affixed to the adhesive layer 20. Removal of the protective cover 22 will allow the adhesive material 20 to adhere to the telephone handset portion 12 bringing the pad 14 with the gauze material 18 into engagement with the telephone handset portion 12 to sterilize it.

The pad 14 is fabricated out of sponge rubber material. The sterilizing substance is contained in a disinfectant liquid cell 24 having a canal 26. The cell 24 is carried within the sponge rubber pad 14 with the canal 26 extending towards the gauze material 18. When a person (not shown) uses the telephone handset 12 and presses the sponge rubber pad 14 against their face the sterilizing substance will be squeezed out into the pad 14 and the gauze material 18.

Flap members 28 are each affixed at one end to one edge of the pad 14, with glue 30 is applied to the free end of each flap member 28. When the pad 14 is applied to the telephone handset portion 12, the flap members 28 are extended outwardly over the handset surface allowing the glue 30 to adhere to sides of the telephone handset portion 12, thus further securing the pad to the handset.

As shown in FIG. 1, a tab member 32 is provided on the protective cover 22 to facilitate removal of the protective cover 22 from the adhesive layer 20, before the adhesive layer is applied to the telephone handset portion 12.

Figure 3:
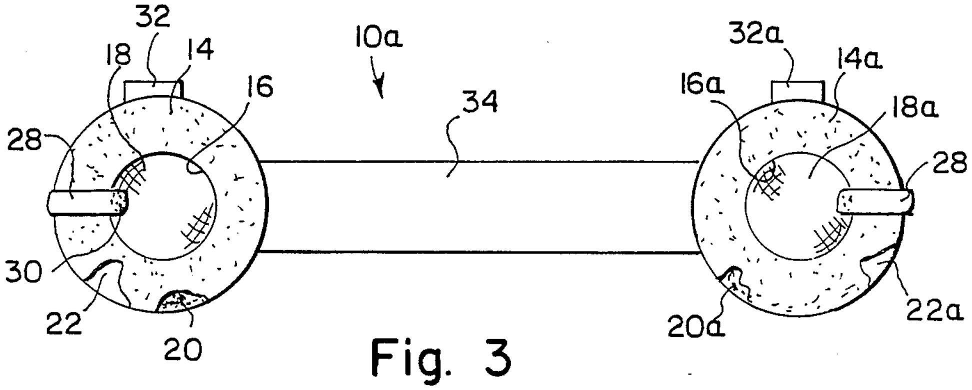
FIG. 3 is a top view of a modification for disinfecting and protecting both transmitter and receiver portions of the telephone handset.

FIG. 3 shows a modified device 10*a* containing a second sterilizing substance carrying pad 14*a* with a central aperture 16*a* therethrough, a second layer of gauze material 18*a*, a second layer of adhesive material 20*a* and a second protective cover 22*a* being of identical structure. An elongated interconnecting member 34 extends between the pads 14 and 14*a* and is dimensioned such that the distance between the pads 14 and 14*a* defined by the interconnecting member 34 is approximately that of the separating distance of the transmitter and receiver portions of the telephone handset 12.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A telephone sterilizing device adapted for mounting on a transmitter or receiver of a telephone handset, said device comprising:

(a) a sterilizing substance carrying pad having a central aperture therethrough and a peripheral shape corresponding generally to said transmitter or receiver;

(b) a layer of gauze material attached to and substantially covering said central aperture to allow sound to travel therethrough while protecting said transmitter or receiver;

(c) a layer of adhesive material applied to one side of said pad;

(d) a protective cover having a peripheral shape corresponding to said pad and being removably affixed to said adhesive layer whereby removal of said protective cover will allow said adhesive material to be applied to the telephone handset portion bringing said pad with said gauze material into engagement with said transmitter or receiver;

(e) said pad being fabricated out of sponge rubber material and (f) said sterilizing substance being contained in a disinfectant liquid cell having a canal, said cell carried within said sponge rubber pad with said canal extending towards said gauze material so that when a person using the telephone handset presses said sponge rubber pad against their face said sterilizing substance will be squeezed out into said pad and said gauze material.

2. A device as recited in claim 1, further comprising:

(a) a flap member having a free end and an opposite end affixed to said pad;

(b) glue applied to said free end of said flap member so that when said pad is applied to the telephone handset portion said flap member can be outwardly extended and adhered to the side of said telephone handset.

3. A device as recited in claim 2, further comprising a tab member provided on said protective cover to facilitate removal of said protective cover from said adhesive layer, before said adhesive layer is applied to said transmitter or receiver.

4. A device recited in claim 3, further comprising:

(a) a second sterilizing substance carrying pad having a second central aperture therethrough and a peripheral shape corresponding generally to the telephone handset portion;

(b) a second layer of gauze material attached to and substantially covering said second central aperture to allow sound to travel therethrough while protecting said transmitter or receiver;

(c) a second layer of adhesive material applied to one side of said second pad;

(d) a second protective cover having a peripheral shape corresponding to and being removably affixed to said second adhesive layer, whereby removal of said second protective cover will allow said second adhesive material to be applied to said transmitter or receiver;

(e) an elongated interconnecting member extending between said pads and being dimensioned such that the distance between said pads defined by said interconnecting member is approximately that of the separating distance of the transmitter and receiver of said telephone handset.

* * * * *